(12) United States Patent
Mizobe

(10) Patent No.: US 11,708,176 B2
(45) Date of Patent: *Jul. 25, 2023

(54) CONTROL DEVICE, CONTROL DEVICE SYSTEM, RUNWAY FLASH LIGHTING DEVICE CONTROL SYSTEM, PROGRAM, AND RECORDING MEDIUM

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,314

(22) Filed: Aug. 23, 2022

(65) Prior Publication Data

US 2022/0402628 A1 Dec. 22, 2022

Related U.S. Application Data

(63) Continuation of application No. 17/287,353, filed as application No. PCT/JP2019/032557 on Aug. 21, 2019, now Pat. No. 11,459,120.

(30) Foreign Application Priority Data

Oct. 26, 2018 (JP) .................................. 2018-201403

(51) Int. Cl.
*B64F 1/20* (2006.01)
*B64D 47/02* (2006.01)
*H04B 10/112* (2013.01)
*H04B 10/40* (2013.01)

(52) U.S. Cl.
CPC ................ *B64F 1/20* (2013.01); *B64D 47/02* (2013.01); *H04B 10/1125* (2013.01); *H04B 10/40* (2013.01)

(58) Field of Classification Search
CPC ....... B64F 1/20; B64D 47/02; H04B 10/1125; H04B 10/40
See application file for complete search history.

(56) References Cited

U.S. PATENT DOCUMENTS

2021/0024225 A1  1/2021 Cazzani

FOREIGN PATENT DOCUMENTS

JP  2002-362498 A  12/2002

OTHER PUBLICATIONS

International Search Report for PCT/JP2019/032557 dated Oct. 8, 2019 (PCT/ISA/210).

*Primary Examiner* — Quan Zhen Wang
*Assistant Examiner* — Rajsheed O Black-Childress
(74) *Attorney, Agent, or Firm* — Sughrue Mion, PLLC

(57) ABSTRACT

A control device includes: a control signal transmitter transmitting a signal to a controlled device; a control signal receiver receiving a signal from the controlled device; a control signal generator generating a control signal of 2 bytes or more in one transmission cycle, in which an address is assigned to each byte, is ON/OFF switchable, and includes a main signal address and a collation signal address; and a control signal controller that, when the main and collation signal addresses are the same address, turns the collation signal address ON when the main signal address is ON and turns the collation signal address OFF when the main signal address is OFF, and when the main and collation signal addresses are inverted, turns the collation signal address OFF when the main signal address is ON and turns the collation signal address ON when the main signal address is OFF.

4 Claims, 6 Drawing Sheets

CONTROL DEVICE, CONTROL DEVICE SYSTEM, RUNWAY FLASH LIGHTING DEVICE CONTROL SYSTEM, PROGRAM, AND RECORDING MEDIUM

CROSS REFERENCE TO RELATED APPLICATIONS

This application is a Continuation of U.S. application Ser. No. 17/287,353 filed Apr. 21, 2021 which is a National Stage of International Application No. PCT/JP2019/032557 filed Aug. 21, 2019, claiming priority based on Japanese Patent Application No. 2018-201403 filed Oct. 26, 2018, the contents of which are incorporated hereinto by reference.

TECHNICAL FIELD

The present invention relates to a control device, a control device system, a runway flash lighting device control system, a program, and a recording medium.

BACKGROUND ART

Conventionally, flash lighting devices have been used to guide an aircraft approaching a runway when touching down at an airport. The control of the flash lighting device is performed by a system in which a control master station and a control slave station transmit and receive control signals to and from each other by wired signals (Patent Literature 1).

CITATION LIST

Patent Literature

Patent Literature 1: JP 2002-362498 A

SUMMARY OF INVENTION

Technical Problem

However, signal processing without being affected by the noise is required for controlling the flash lighting device. This problem is not limited to the control of the flash lighting device, and the same problem also arises in traffic signals, train signals, and the like in which signal processing without being affected by the noise is required, for example.

With the foregoing in mind, it is an object of the present invention to provide a control device that can perform signal processing without being affected by the noise and a control device system using the same.

Solution to Problem

In order to achieve the above object, the present invention provides a first control device including: a control signal transmitter; a control signal receiver; a control signal generator; and a control signal controller, wherein the control signal transmitter transmits a signal to a device to be controlled, the control signal receiver receives a signal from the device to be controlled, the control signal generator generates a control signal of 2 bytes or more in one transmission cycle, in the control signal, an address is assigned to each byte, and each address is ON/OFF switchable, the address of the control signal of 2 bytes or more includes a main signal address and a collation signal address associated with the main signal address, in a case where the main signal address and the collation signal address are the same signal, the control signal controller turns the collation signal address ON when the main signal address is ON and turns the collation signal address OFF when the main signal address is OFF, and in a case where the main signal address and the collation signal address are inverted, the control signal controller turns the collation signal address OFF when the main signal address is ON and turns the collation signal address ON when the main signal address is OFF.

The present invention also provides a second control device including: a control signal transmitter; a control signal receiver; a control signal generator; and a control signal controller, wherein the control signal transmitter transmits a signal to a device to be controlled, the control signal receiver receives a signal from the device to be controlled, the control signal generator generates a control signal of 2 bytes or more in one transmission cycle, in the control signal, an address is assigned to each byte, and each address is ON/OFF switchable, and when a specific address is turned ON in a nth control signal, the control signal controller turns ON the same address as the specific address turned ON in the nth control signal at least twice consecutively even in the nth and subsequent control signals.

The present invention also provides a control device system including: two control devices, wherein the two control devices transmit and receive control signals to and from each other by wired signals, one of the two control devices is the first control device according to the present invention, and the other of the two control devices is the second control device according to the present invention.

Advantageous Effects of Invention

The present invention can provide a control device that can perform signal processing without being affected by the noise and a control device system using the same.

DESCRIPTION OF EMBODIMENTS

Figure 1:
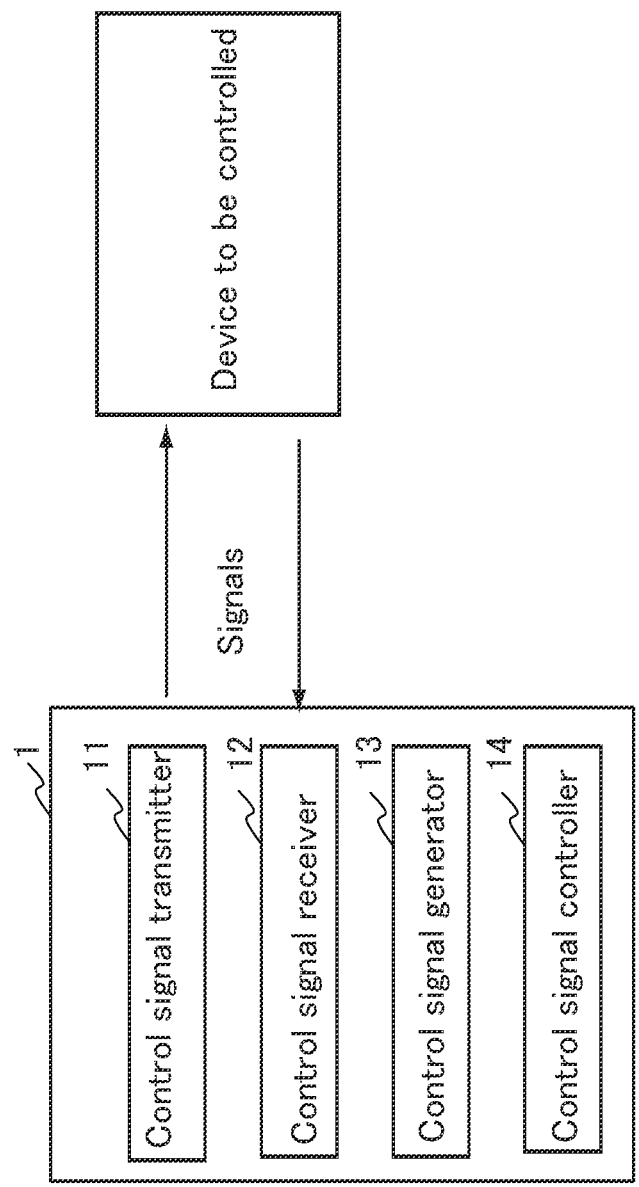
FIG. 1 is a block diagram showing the configuration of an exemplary control device of the present invention.

The runway flash lighting device control system of the present invention includes: a flash lighting control device; and a flash lighting device, wherein the flash lighting control device and the flash lighting device transmit and receive control signals to and from each other by wired signals, the flash lighting control device includes the first control device according to the present invention, the flash lighting device includes the second control device according to the present invention, flashing of the flash lighting device is controlled by the control signal from the flash lighting control device, and control of the flash lighting control device is controlled by the control signal from the flash lighting device.

The first control method of the present invention includes: a control signal transmitting step; a control signal receiving step; a control signal generating step; and a control signal controlling step, wherein the control signal transmitting step transmits a signal to a device to be controlled, the control signal receiving step receives a signal from the device to be controlled, the control signal generating step generates a control signal of 2 bytes or more in one transmission cycle, in the control signal, an address is assigned to each byte, and each address is ON/OFF switchable, the address of the control signal of 2 bytes or more includes a main signal address and a collation signal address associated with the main signal address, in a case where the main signal address and the collation signal address are the same signal, the control signal controlling step turns the collation signal address ON when the main signal address is ON and turns the collation signal address OFF when the main signal address is OFF, and in a case where the main signal address and the collation signal address are inverted, the control signal controlling step turns the collation signal address OFF when the main signal address is ON and turns the collation signal address ON when the main signal address is OFF.

The second control method of the present invention includes: a control signal transmitting step; a control signal receiving step; a control signal generating step; and a control signal controlling step, wherein the control signal transmitting step transmits a signal to a device to be controlled, the control signal receiving step receives a signal from the device to be controlled, the control signal generating step generates a control signal of 2 bytes or more in one transmission cycle, in the control signal, an address is assigned to each byte, and each address is ON/OFF switchable, and when a specific address is turned ON in a nth control signal, the control signal controlling step turns ON the same address as the specific address turned ON in the nth control signal at least twice consecutively even in the nth and subsequent control signals.

The program of the present invention is a program that can execute the method according to the present invention on a computer.

The computer-readable recording medium of the present invention is a computer-readable recording medium recorded with the program according to the present invention.

The application of the present invention is not particularly limited. The present invention is applicable, for example, to a flash lighting control device, a flash lighting device, and a runway flash lighting device control system as described above. In addition, the present invention is also applicable to a system for transmitting and receiving wired control signals such as traffic signals, train signals, and the like.

Next, the embodiments of the present invention will be described with reference to FIGS. 1 to 6. The present invention is not limited or restricted by the following embodiments by any means. In FIGS. 1 to 6, identical parts are indicated with identical reference signs. Regarding the descriptions of the embodiments, reference can be made to one another. Furthermore, for convenience in explanation, the structure of each component may be appropriately simplified, and the size, the ratio, and the like of components may be schematically shown and different from actual ones.

First Embodiment

The present embodiment relates to the first control device of the present invention. FIG. 1 is a block diagram showing the configuration of an exemplary control device according to the present embodiment. As shown in FIG. 1, a control device 1 includes a control signal transmitter 11, a control signal receiver 12, a control signal generator 13, and a control signal controller 14.

The control signal transmitter 11 transmits signals to a device to be controlled. The control signal transmitter 11 is only required to be capable of transmitting signals to the device to be controlled, and examples thereof include a central processing unit (CPU), a microprocessor, and a microcontroller (microcomputer).

The control signal receiver 12 receives signals from a device to be controlled. The control signal receiver 12 is only required to be capable of receiving signals from the device to be controlled, and examples thereof include a CPU, a microprocessor, and a microcomputer.

The control signal generator 13 generates control signals of 2 bytes or more in one transmission cycle. In the control signal, an address is assigned to each byte, and each address is ON/OFF switchable. The address of the control signal of 2 bytes or more includes a main signal address and a collation signal address associated with the main signal address. The control signal generator 13 is only required to be capable of generating the control signals, and examples thereof include a CPU, a microprocessor, and a microcomputer.

In the case where the main signal address and the collation signal address are the same signal, the control signal controller 14 turns the collation signal address ON when the main signal address is ON and turns the collation signal address OFF when the main signal address is OFF. In the case where the main signal address and the collation signal address are inverted, the control signal controller 14 turns the collation signal address OFF when the main signal address is ON and turns the collation signal address ON when the main signal address is OFF. The control signal controller 14 is only required to be capable of controlling the control signals, and examples thereof include a CPU, a microprocessor, and a microcomputer.

Next, an example of the treatment (the first control method of the present invention) in the present device 1 will be described using the block diagram of FIG. 1 and the flowchart of FIG. 2. It is to be noted, however, that there is no limitation on the order of performing the steps as long as the first control method of the present invention includes a control signal generating step and a control signal controlling step and a control signal transmitting step corresponding thereto, which are performed at least once in this order. A plurality of steps may be simultaneously performed if it is possible. The number of times of performing each step is not particularly limited, and each step may be performed once or may be performed a plurality of times (two or more times).

Figure 2:
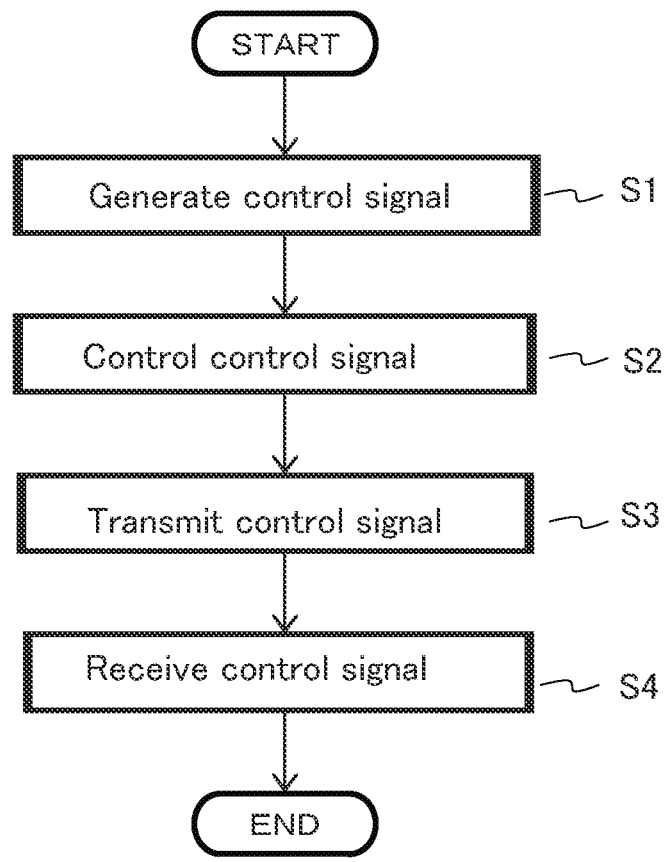
FIG. 2 is a flow chart showing an exemplary process of the control device of the present invention.

In the example shown in FIG. 2, first, a control signal of 2 bytes or more is generated in one transmission cycle (S1). In the control signal, an address is assigned to each byte, and each address is ON/OFF switchable. The address of the control signal of 2 bytes or more includes a main signal address and a collation signal address associated with the main signal address.

Figure 3:
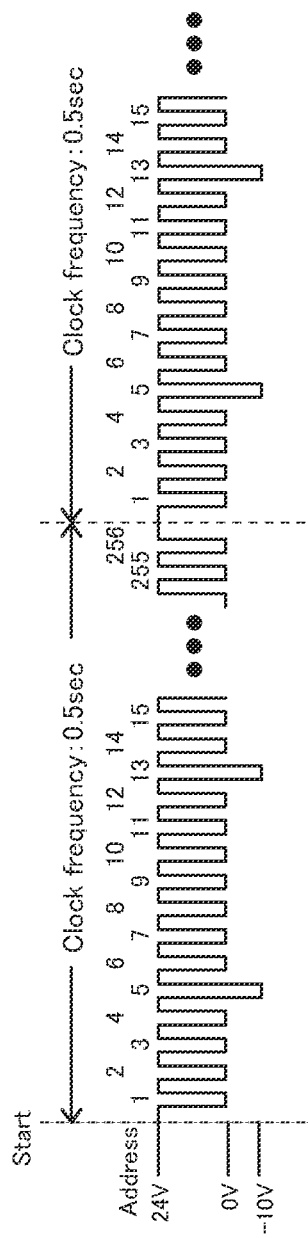
FIG. 3 is a diagram for explaining an example of signal generation and control in the present invention.

Control signal generation in the present embodiment will be described using FIG. 3. In the present embodiment, the control signal is only required to be 2 bytes or more in one transmission period. In the case of the control device for the flash lighting control device of the runway flash lighting device control system, for example, the control signal may be a control signal of 256 bytes in a transmission period (clock frequency) of 0.5 seconds, which is a flash lighting period, as shown in FIG. 3. In the control signal, addresses (1, 2, 3, ..., 255, 256) are assigned to respective bytes, and the addresses are ON/OFF switchable. In the example shown in FIG. 3, when a voltage of −10V is applied to a specified address, the specified address is turned ON (=1), and when no voltage (0V) is applied to a specific address, the specific address is turned OFF (=0). The address of the control signal includes a main signal address corresponding to each transmission content and a collation signal address associated with the main signal address. For example, the address 5 is a main signal address for ordering light emission of the flash lighting device, and the address 13 is a collation signal address associated with the main signal address 5. Similarly, for example, the address 6 is a main signal address for ordering flash lighting at a low light intensity, the address 14 is a collation signal address associated with the main signal address 6, the address 7 is a main signal address for ordering flash lighting at a medium light intensity, the address 15 is a collation signal address associated with the main signal address 7, the address 8 is a main signal address for ordering activation of the heater, and the address 16 is a collation signal address associated with the address 8.

Next, in the case where the main signal address and the collation signal address are the same signal, the collation signal address is turned ON when the main signal address is ON and the collation signal address is turned OFF when the main signal address is OFF, and in the case where the main signal address and the collation signal address are inverted, the collation signal address is turned OFF when the main signal address is ON and the collation signal address is turned ON when the main signal address is OFF (S2). In the example shown in FIG. 3, the main signal address and the collation signal address are the same signal such that when the main signal address 5 for ordering light emission of the flash lighting device is ON, the collation signal address 13 associated therewith is also turned ON, and when the other main signal addresses are OFF, the collation signal addresses associated therewith are also turned OFF. Instead of the example shown in FIG. 3, the main signal address and the collation signal address may be inverted such that when the main signal address 5 for ordering light emission of the flash lighting device is ON, the collation signal address 13 associated therewith is turned OFF, and when the other main signal addresses are OFF, the collation signal addresses associated therewith are turned ON.

Next, a signal is transmitted to a flash lighting device, which is a device to be controlled (S3). Thereby, the flash lighting device is ordered to emit light.

Next, a signal from the flash lighting device, which is the device to be controlled, is received (S4).

The present embodiment can improve the detection accuracy of the control signal by using two addresses, i.e., the main signal address and the collation signal address, thereby achieving a control device and a control method that can perform signal processing without being affected by the noise.

In addition, the present embodiment allows a long-distance transmission of a control signal and allows both of ordinary electric wires and optical cables to be used for transmission of a control signal, thereby achieving an inexpensive device configuration.

Second Embodiment

The present embodiment relates to the second control device of the present invention. The configuration of an exemplary control device 1 of the present embodiment is the same as that of the first control device of the first embodiment shown in FIG. 1. The control device 1 includes a control signal transmitter 11, a control signal receiver 12, a control signal generator 13, and a control signal controller 14.

The control signal transmitter 11 and the control signal receiver 12 are the same as those in the first control device of the first embodiment.

The control signal generator 13 generates a control signal of 2 bytes or more in one transmission cycle. In the control signal, an address is assigned to each byte, and each address is ON/OFF switchable. As in the first embodiment, the control signal generator 13 is only required to be capable of generating a control signal, and examples thereof include a CPU, a microprocessor, and a microcomputer.

When a specific address is turned ON in the nth control signal, the control signal controller 14 turns ON the same address as the specific address turned ON in the nth control signal at least twice consecutively even in the nth and subsequent control signals. The control signal controller 14 is only required to be capable of controlling a control signal, and examples thereof include a CPU, a microprocessor, and a microcomputer.

Next, an example of the treatment (the second control method of the present invention) in the present device 1 will be described using the block diagram of FIG. 1 and the flowchart of FIG. 2. It is to be noted, however, that there is no limitation on the order of performing the steps as long as the second control method of the present invention includes a control signal generating step and a control signal controlling step and a control signal transmitting step corresponding thereto, which are performed at least once in this order. A plurality of steps may be simultaneously performed if it is possible. The number of times of performing each step is not particularly limited, and each step may be performed once or may be performed a plurality of times (two or more times).

In the example shown in FIG. 2, first, a control signal of 2 bytes or more is generated in one transmission cycle (S1). In the control signal, an address is assigned to each byte, and each address is ON/OFF switchable.

Figure 4:
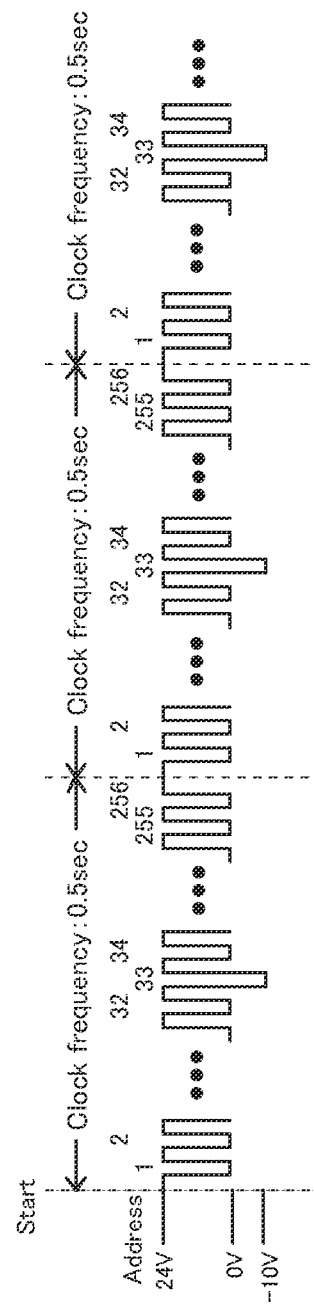
FIG. 4 is a diagram for explaining another example of signal generation and control in the present invention.

Control signal generation in the present embodiment will be described using FIG. 4. In the present embodiment, the control signal is only required to be 2 bytes or more in one transmission period. In the case of the control device for the flash lighting device of the runway flash lighting device control system, for example, the control signal may be a control signal of 256 bytes in a transmission period (clock frequency) of 0.5 seconds, which is a flash lighting period, as shown in FIG. 4. In the control signal, addresses (1, 2, 3, ..., 255, 256) are assigned to respective bytes, and the addresses are ON/OFF switchable. In the example shown in FIG. 4, when a voltage of −10V is applied to a specified address, the specified address is turned ON (=1), and when no voltage (0V) is applied to a specific address, the specific address is turned OFF (=0).

Next, when a specific address is turned ON in a nth control signal, the control signal controller turns ON the same address as the specific address turned ON in the nth control signal at least twice consecutively even in the nth and subsequent control signals (S2). In the example shown in FIG. 4, since the address 33 is turned ON in the first control signal, the same address 33 as the address 33 turned on in the first control signal is turned ON three times consecutively in the first and subsequent control signals. For example, a specific transmission content is allocated to the each of the addresses 1 to 256 such that the address 33 is an address for notifying an abnormality in the flash lighting device, the address 34 is an address for notifying the abnormality of the power supply, the address 35 is an address for notifying the two-circuit interruption of the flash lighting source such as an LED, the address 161 is an address for notifying the activation of the heater, the address 201 is an address for ordering the life-and-death monitoring, and the like. The number of times of consecutively turns a specific address ON may be two or four or more times, and is preferably three times.

Next, a signal is transmitted to a flash lighting control device, which is a device to be controlled (S3). Thereby, the flash lighting control device detects an anomaly in the flash lighting device.

Next, a signal from the flash lighting control device, which is the device to be controlled, is received (S4).

The present embodiment can provide a control device and a control method that can perform signal processing without being affected by the noise by turning ON the same address as the specific address at least twice consecutively in a plurality of times of control signals.

In addition, as in the first embodiment, the present embodiment allows a long-distance transmission of a control signal and allows both of ordinary electric wires and optical cables to be used for transmission of a control signal, thereby achieving an inexpensive device configuration.

Third Embodiment

Figure 5:
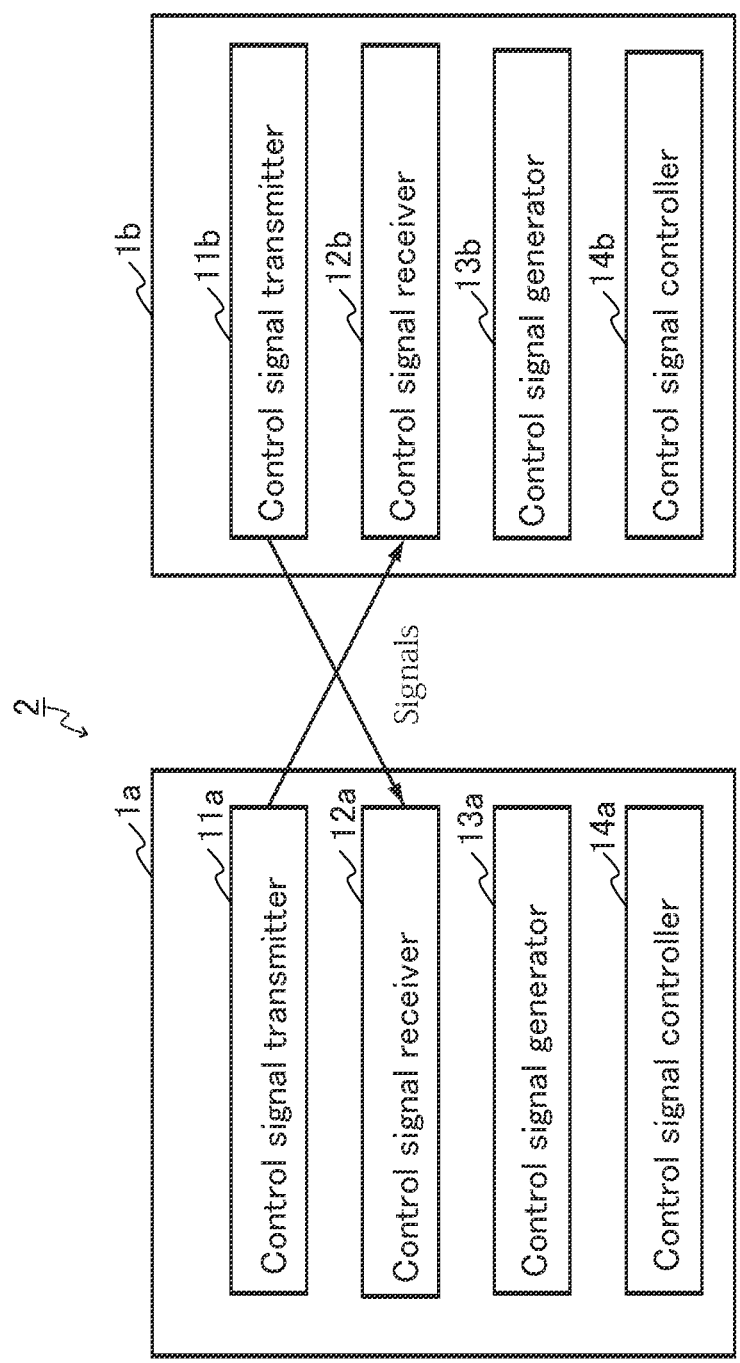
FIG. 5 is a block diagram showing the configuration of an exemplary control device system of the present invention.

The present embodiment relates to the control device system of the present invention. FIG. 5 is a block diagram showing the configuration of an exemplary control device system according to the present embodiment. As shown in FIG. 5, a control device system 2 includes two control devices 1a and 1b. One control device 1a of the two control devices is the first control device of the present invention. The other control device 1b of the two control devices is the second control device of the present invention. The two control devices 1a and 1b transmit and receive control signals to and from each other by wired signals.

Figure 6:
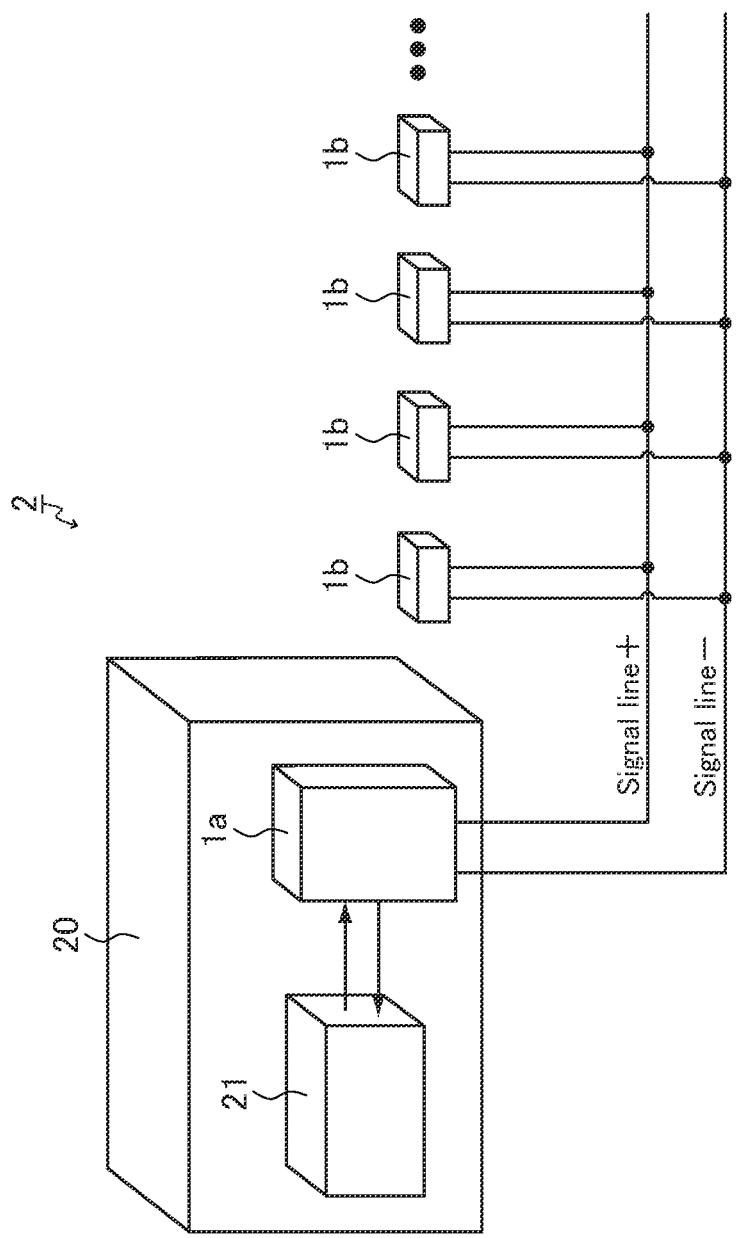
FIG. 6 is a block diagram showing the configuration of an exemplary runway flash lighting device control system of the present invention.

Next, the control device system 2 of the present embodiment will be described using FIG. 6 with reference to a runway flash lighting device control system. As shown in FIG. 6, the runway flash lighting device control system 2 includes a flash lighting control device 1a, which is the first control device of the present invention, and a flash lighting device 1b, which is the second control device of the present invention. The flash lighting control device 1a constitutes a controller 20 together with a sequencer (computer) 21 connected thereto.

The present system 2 has a pair of communication wires, one of which is an input wire for transmitting a control signal from the controller 20 (flash lighting control device 1a) to the flash lighting device 1b, and the other of which is an output wire for performing feed back of information from the flash lighting device 1b to the controller 20 (flash lighting control device 1a). One of the pair of communication wires may be referred to as a (+) line, and the other may be referred to as a (−) line. The flash lighting control device 1a and flash lighting device 1b transmit and receive control signals to and from each other by wired signals, flashing of the flash lighting device 1b is controlled by the control signal from the flash lighting control device 1a, and control of the flash lighting control device 1a is controlled by the control signal from the flash lighting device 1b.

The present embodiment can provide a control device system that can perform signal processing without being affected by the noise.

In addition, the present embodiment allows a long-distance transmission of a control signal and allows both of ordinary electric wires and optical cables to be used for transmission of a control signal, thereby achieving an inexpensive system configuration.

Fourth Embodiment

The program of the present embodiment is a program that can execute the control method of the first embodiment or the second embodiment on a computer. The program of the present embodiment may be recorded on, for example, a computer-readable recording medium. The recording medium is not particularly limited, and examples thereof include a read-only memory (ROM), a hard disk (HD), an optical disk, and a floppy disk (FD).

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2018-201403 filed on Oct. 26, 2018. The entire subject matter of the Japanese Patent Application is incorporated herein by reference.

INDUSTRIAL APPLICABILITY

The present invention can provide a control device that can perform signal processing without being affected by the noise and a control device system using the same.

REFERENCE SIGNS LIST

1, 1a, 1b: control device
2: control device system, runway flash lighting device control system
11: control signal transmitter
12: control signal receiver
13: control signal generator
14: control signal controller

The invention claimed is:

1. A control device system comprising:
a first control device and a second control device different from the first control device, wherein
the first control device comprises:
a control signal transmitter;
a control signal receiver;
a control signal generator; and
a control signal controller,
wherein
the control signal generator is configured to generate a control signal of 2 bytes or more in one transmission cycle,
in the control signal, an address is assigned to each byte, and each address is ON/OFF switchable,
the address of the control signal of 2 bytes or more includes a main signal address and a collation signal address associated with the main signal address,
in a case where the main signal address and the collation signal address are the same address, the control signal controller turns the collation signal address ON when the main signal address is ON and turns the collation signal address OFF when the main signal address is OFF, and in a case where the main signal address and the collation signal address are inverted, the control signal controller turns the collation signal address OFF when the main signal address is ON and turns the collation signal address ON when the main signal address is OFF, and the control signal transmitting device of the first control device transmits the control signal to the second control device, the control signal receiving device of the first control device receives a control signal generated by and transmitted from the second control device.

2. A runway flash lighting device control system, comprising;

a flash lighting control device comprising the first control device of claim 1; and a flash lighting device comprising the second control device of claim 1, wherein the flash lighting control device is configured to transmit a first flash control signal to the flash lighting device and receive a second flash control sign transmitted from the flash lighting device;

the flash lighting device is configured to transmit the second flash control signal to the flash lighting control device and receive the first flash control signal transmitted from the flash lighting control device, wherein flashing of the flash lighting device is controlled by the first control signal from the flash lighting control device, and control of the flash lighting control device is controlled by the second control signal from the flash lighting device.

3. A control device system comprising:

a first control device and a second control device different from the first control device, wherein a first control device comprises:

a control signal transmitter;

a control signal receiver;

a control signal generator; and a control signal controller, wherein the control signal generator is configured to generate a control signal of 2 bytes or more in one transmission cycle, in the control signal, an address is assigned to each byte, and each address is ON/OFF switchable, and when a specific address is turned ON in a nth control signal, where n is an integer, the control signal controller turns ON the same address as the specific address turned ON in the nth control signal in at least two consecutive control signals including the nth control signal, and the control signal transmitting device of the first control device transmits the control signal to the second control device, the control signal receiving device of the first control device receives a control signal generated by and transmitted from the second control device.

4. A runway flash lighting device control system, comprising;

a flash lighting control device comprising the first control device of claim 3; and a flash lighting device comprising the second control device of claim 3, wherein the flash lighting control device is configured to transmit a first flash control signal to the flash lighting device and receive a second flash control signal transmitted from the flash lighting device;

the flash lighting device is configured to transmit the second flash control signal to the flash lighting control device and receive the first flash control sign transmitted from the flash lighting control device, wherein flashing of the flash lighting device is controlled by the first control signal from the flash lighting control device, and control of the flash lighting control device is controlled by the second control signal from the flash lighting device.

\* \* \* \* \*